United States Patent
Cleary

[15] 3,696,525
[45] Oct. 10, 1972

[54] TOUCH DETECTING TEACHING MACHINE

[72] Inventor: Alan Cleary, 7 and 8 Sydenham Terrace, Newcastle upon Tyne, England

[22] Filed: Nov. 2, 1970

[21] Appl. No.: 86,173

[30] Foreign Application Priority Data
Nov. 13, 1969   Great Britain..........55,602/69

[52] U.S. Cl. ..................................................35/9 B
[51] Int. Cl. ..............................................G09b 7/06
[58] Field of Search ................35/9 R, 9 A, 9 B, 35 C

[56] References Cited

UNITED STATES PATENTS

| | | |
|---|---|---|
| 2,603,006 | 7/1952 | MacChesney..............35/35 C |
| 3,382,588 | 5/1968 | Serrell et al..................35/9 A |
| 3,477,140 | 11/1969 | Ryan et al...................35/35 C |
| 3,516,176 | 6/1970 | Cleary et al..................35/9 B |
| 3,584,398 | 6/1971 | Meyer et al..................35/9 A |

*Primary Examiner*—W. H. Grieb
*Attorney*—Harry R. Lubcke

[57] ABSTRACT

A touch detecting teaching machine for teaching young children or those with sub-normal intelligence. The machine is a desk model having three display panels on which symbolic visual information can be presented by means of a card which s fed into the machine. The machine asks the subject a question about the visual information displayed and invites him to select the correct alternative. The subject gives his answer by touching the appropriate panel and the machine responds if he has answered correctly.

9 Claims, 10 Drawing Figures

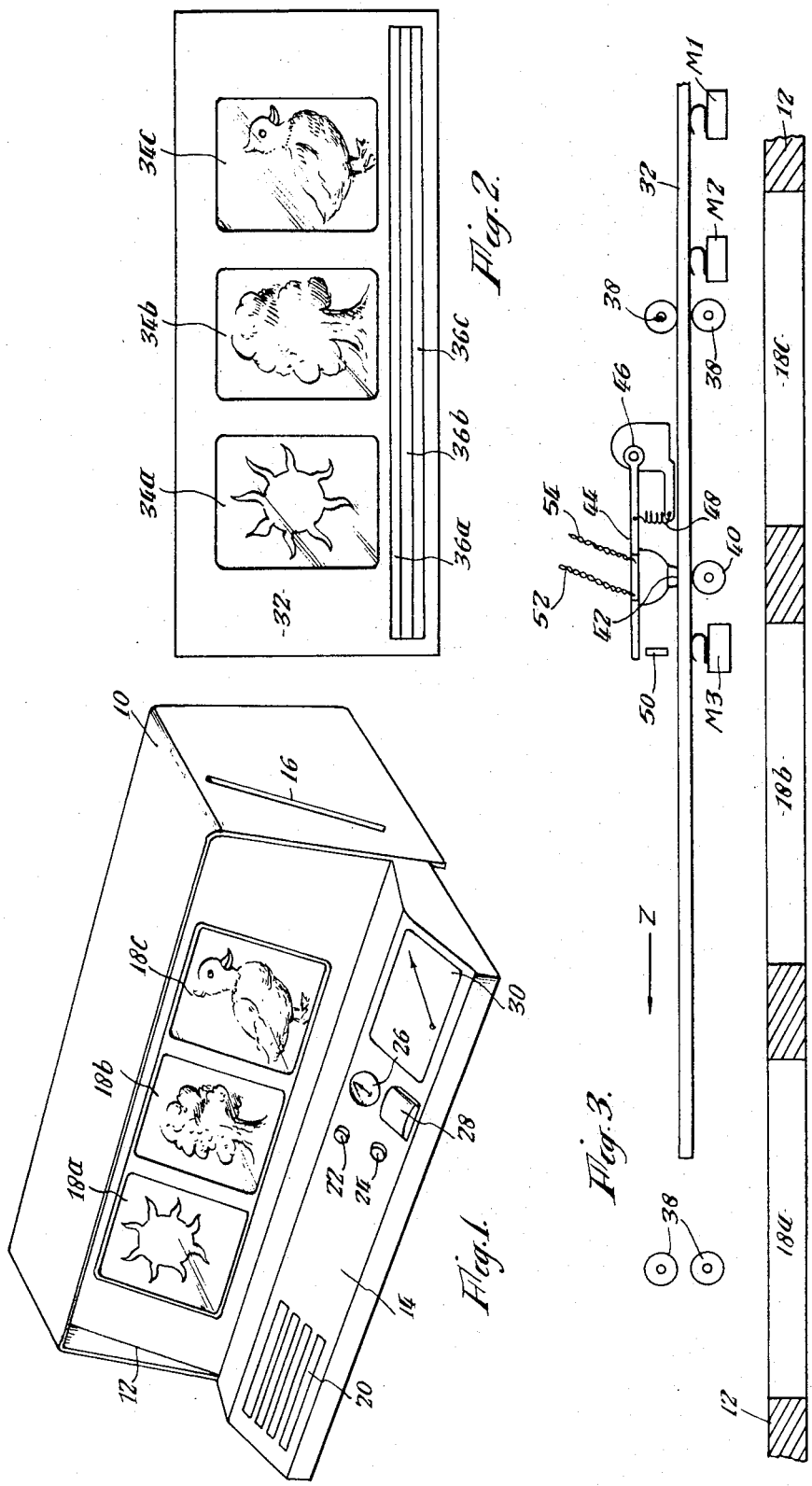

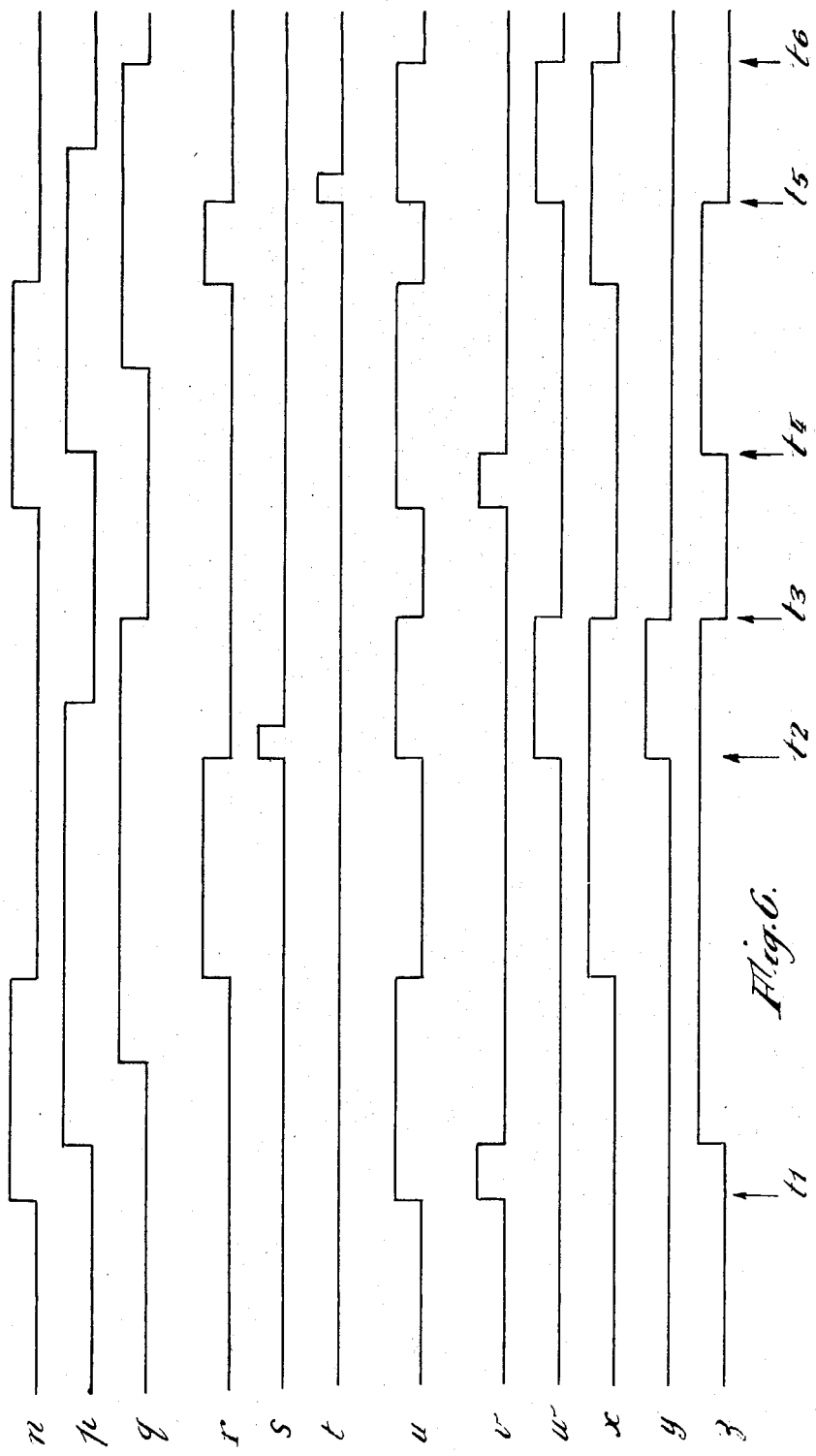

| INPUTS | | | OUTPUT |
|---|---|---|---|
| 1 | 1 | 1 | 0 |
| 1 | 1 | 0 | 1 |
| 1 | 0 | 1 | 1 |
| 1 | 0 | 0 | 1 |
| 0 | 1 | 1 | 1 |
| 0 | 1 | 0 | 1 |
| 0 | 0 | 1 | 1 |
| 0 | 0 | 0 | 1 |
*Fig.5a.*
| INPUT | OUTPUT |
|---|---|
| 1 | 0 |
| 0 | 1 |
*Fig.5b.*
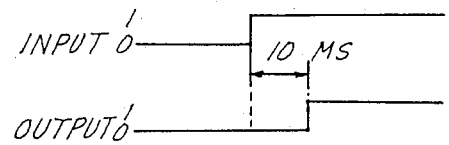
*Fig.5c.*
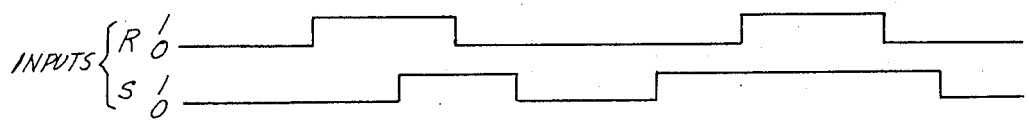
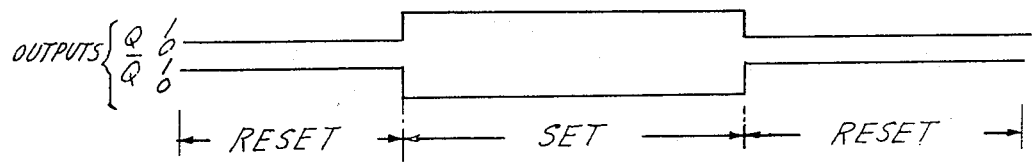
*Fig.5d.*

TOUCH DETECTING TEACHING MACHINE

BACKGROUND OF THE INVENTION

A teaching machine for teaching young children who have not yet learnt to read, adults or children of subnormal intelligence and those persons under some form of physical and/or mental handicap has been described in the specification of U.S. Pat. No. 3,516,176. This machine essentially includes a display screen arranged to be touched by the subject, a projector for displaying on one part of the screen symbolic visual information and on the other part two or more further items, one of which is related to the information in the first part of the screen, an electronic register for determining which of the items the subject has selected by touching the screen in a zone within which the item is projected on the screen, a speaker which gives an audible indication only if the related item is touched and display changing means which operate after a predetermined interval of time from the instant of touching whether or not the related item has been touched.

SUMMARY OF THE INVENTION

It is an object of the present invention to provide a random selection for the correct alternative which is determined immediately prior to the display being presented to the subject. The random selection feature ensures that the subject cannot learn the position of a correct alternative by position and reach a high level of performance by memorization.

It is also an object of the present invention to enable the subject to partake more actively in the operation of the teaching machine in so far as he can operate the machine to present the next display. In this respect the machine is more suitable for the more advanced children or handicapped children or adults.

According to the present invention there is provided a touch detecting teaching machine including a plurality of display panels arranged to be touched by a subject, means for displaying or presenting symbolic visual information in each of said panels, means for randomly selecting one of the visual means displayed or presented in the panels to be the correct alternative, means for giving an audible indication to the subject requesting him to select the correct alternative in accordance with the audio indication given to him, electronic registering means for determining which of the plurality of items of symbolic visual information the subject has selected by touching one of the panels and means for giving a further audible indication only if the correct related item is touched.

BRIEF DESCRIPTION OF THE DRAWINGS

The present invention will now be described in greater detail by way of example with reference to the accompanying drawings, wherein:

FIG. 1 shows a perspective view of one preferred form of teaching machine;

FIG. 2 is a view of one card to be used in the teaching machine shown in FIG. 1;

FIG. 3 is a diagram of the card transport system which assists in explaining the operation of the machine;

FIG. 5a is a truth-table illustrating the operation of a "NAND" circuit;

FIG. 5b is a truth-table illustrating the operation of an inverter;

FIG. 5c shows a waveform diagram explaining the operation of the delay circuit shown in FIG. 4;

FIG. 5d shows a waveform diagram explaining the operation of a flip-flop; and

FIG. 6 shows a number of waveforms for explaining the operation of the device.

DESCRIPTION OF THE PREFERRED EMBODIMENTS

Figure 3A:
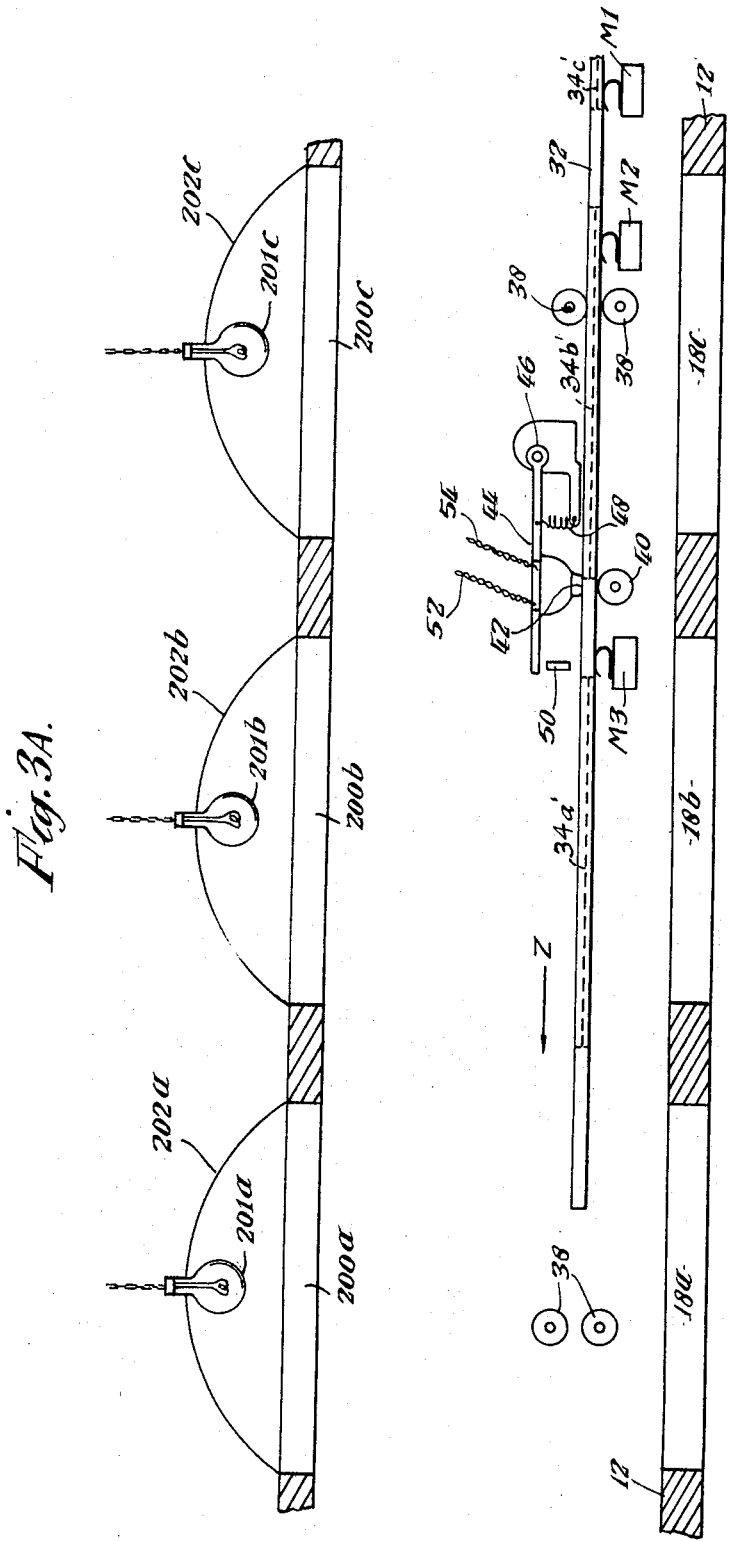
FIG. 3A is a modified form of card transport system for use in the case where transparencies are employed.

Referring first to FIG. 1, the touch detecting teaching machine comprises a casing 10 having a front panel 12 and a control panel 14. The side panels of the casing 10 are each provided with an inclined slot 16 whose length and width is just slightly greater than the height and thickness of a card to be inserted in the machine. The front panel 12 is provided with three touch detecting panels 18a, 18b and 18c on which display from a card is projected or viewed through. These touch sensitive panels and the associated electronic circuits may be similar to the panels and circuits described in the specification of U.S. Pat. No. 3,516,176. The control panel 14 includes a loud speaker 20, a microphone jack 22 for recording, a head set jack 24, a key operated switch 26 having four positions, a criterion indicator 28 and a performance computer meter 30, which are operated from the output of a performance computer (not shown in FIG. 1). The performance computer is of the same general type as that disclosed in my U.S. Pat. No. 3,516,176. The four positions of the switch 26 are as follows:

1. normal operation;
2. record on track for left hand panel;
3. record on track for center panel; and
4. record on track for right hand panel.

The casing 10 also includes all the electrical and electronic equipment necessary to operate the machine, and an illumination system where this is provided.

A typical card is shown in greater detail in FIG. 2. It comprises a border 32 which frames three areas 34a, 34b and 34c on which material is printed depicting the sun, a tree and a duck from left to right respectively. Immediately underneath the three printed areas 34 there are arranged three magnetic tracks 36a, 36b and 36c respectively associated with the three areas 34a, 34b and 34c. Each magnetic track is divided into two parts, a first part which is on the left hand side in the drawing on which is recorded wording in the form of a question which is appropriate to the printed area with which it is associated. For example, the track 36c would have recorded thereon "Point to the duck." The second part of the track has recorded thereon in each case the following words "That's right."

As shown in FIG. 3 behind the front panel 12 and the touch panels 18a, 18b and 18c there is located pairs of guide rollers 38 situated both towards the upper and lower edges of the card 32 in order to guide the card on entering and leaving the teaching machine. A rubber faced drive capstan 40 is provided to drive the card into the machine in the direction of the arrow Z once the subject has partly inserted the card into the slot 16. This drive capstan is driven by an electric motor housed within the casing 10. Three magnetic heads 42 arranged one above the other are provided to make contact with the respective tracks 36a, 36b and 36c of the card 32. Each magnetic head is mounted on an arm 44 pivotly mounted at 46 in the framework of the casing 10. Springs 48 ensure that the heads 42 make contact with tracks 36. Stops 50 mounted on the framework of the casing are provided so as to leave clearance between the heads 42 and the capstan 40 when no card is present. Each head 42 has a pair of leads 52 for the erase part of the head and a pair of leads 54 for the record or replay part of the head. Three microswitches M1, M2 and M3 are provided to detect the progress of the card in the machine and to effect operation of the teaching machine. The first microswitch M1 sets a counter in operation for the generation of the random selection and also switches on and off the motor which drives the capstan 40. The second microswitch M2 stops the counter and selects the correct alternative. The time taken to move the card by hand is so much greater than the period of the oscillator controlling the counter that the selection is essentially random. The third microswitch M3 switches off the motor when the card leaves the machine and resets the logic. These microswitches will be described in greater detail in FIG. 4.

In the modified form of card transport system shown in FIG. 3A, in which the three areas 34a', 34b' and 34c' are transparencies, there is additionally provided for the purpose of projecting the transparencies onto the front panel 12, three lamps 201a, 201b and 201c located in front of respective reflectors 202a, 202b and 202c, the light from which pass through respective diffusers 200a, 200b and 200c.

Figure 4:
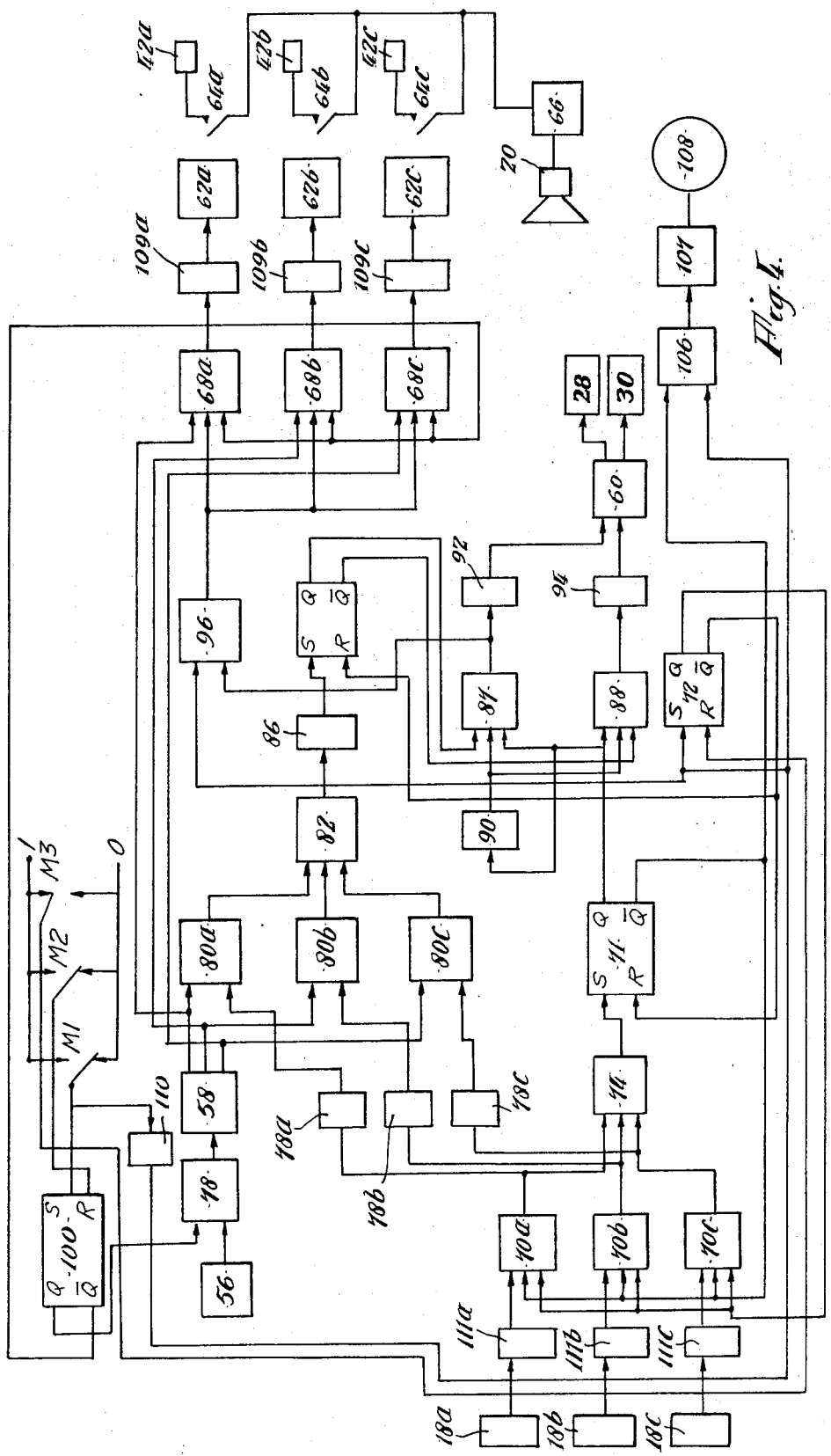
FIG. 4 is a block schematic diagram of the logic system used in the operation thereof.

The block diagram shown in FIG. 4 discloses the logic system of the teaching machine. It includes the touch panels 18a, 18b and 18c, the magnetic heads 42a, 42b and 42c, the loud speaker 20, the microswitches M1, M2 and M3, an oscillator 56, a three stage ring counter 58 and a performance computer 60 as well as numerous "NAND" circuits, inverters and flip-flops to be described later on. The computer 60 supplies an output to both the criterion indicator and meter 30 shown in FIGS. 1 and 4. The operation of the "NAND" circuits, inverters, delay circuit and flip-flops is defined in FIGS. 5a to 5d. The "NAND" circuit is of course logically equivalent to an "AND" circuit with an inverter on the output side thereof. Referring to FIG. 5a it will be seen from the truth-table that the output is always 1 except when all the inputs receive a logical 1 in which case its output is 0. In the case of an inverter the output always shows the opposite logical value from the input as shown in the truth-table of FIG. 5b. Relay drivers 62a, 62b and 62c which operate for a logic 1 input are each associated with the respective magnetic heads 42a, 42b and 42c and each has a respective contact 64a, 64b and 64c in circuit with a head and a common audio amplifier 66 which supplies the loud speaker 20. Each relay driver 62 is controlled from respective "-NAND" circuits 68a, 68b and 68c through inverters 109a, 109b and 109c. Each "NAND" circuit receiving on one of its inputs an output from the ring counter 58.

The output from each touch panel 18 and its associated electronic circuit 111 is connected to one input of respective "NAND" circuits 70a, 70b and 70c. These "NAND" circuits 70 also receive inputs from the $\bar{Q}$ output of flip-flop 71 and the Q output of flip-flop 72. The operation of a typical flip-flop such as would be used for the circuits 71 and 72 will be apparent from the description with reference to the waveforms shown in FIG. 5d. The flip-flop as is well known is a bistable device having two stable states one of which is termed "set" and the other "reset." The two outputs Q and $\bar{Q}$ always have opposite logical values so that in the "set" state the output Q represents the logical value 1 and the output $\bar{Q}$ represents the logical value O, and vice versa during the "reset" state. The flip-flop has its state altered if the logical value 1 is received on its "set" input S when it is in the "reset" state and if the logical value 1 is received on its "reset" input R when it is in the "set" state.

The outputs of the three "NAND" circuits 70 are firstly applied to the three inputs of a "NAND" circuit 74 and also to respective inverters 76a, 76b and 76c. The outputs from these inverters are respectively applied to three "NAND" circuits 80a, 80b and 80c which also each receive an input from the ring counter 58. The ring counter 58 receives the voltage pulses from the oscillator 56 through a "NAND" circuit 78.

The outputs from the three "NAND" circuits 80 are applied to the inputs of a "NAND" circuit 82 which feeds the set input of a flip-flop 84 through an inverter circuit 86. The two outputs from the flip-flop 84 representing the logical functions of Q and $\bar{Q}$ are fed to an input of respective "NAND" circuits 87 and 88. A second input of these two "NAND" circuits receives the logical function Q from the flip-flop 71 whilst the third input receives this function 10 milli-seconds later having passed through a delay circuit 90 as shown by the waveform of FIG. 5c. The "NAND" circuits 87 and 88 feed the performance computer 60 through respective inverters 92 and 94. The "NAND" circuit 87 also supplies a "NAND" circuit 96 with an input.

The output from the "NAND" circuit 74 feeds the set input of the flip-flop 71. The flip-flop 71 receives a resetting pulse on its other input from the Q output of the flip-flop 72, this same $\bar{Q}$ output also being applied to the reset input of flip-flop 84. A flip-flop 100 is controlled from a pair of terminals via the microswitches M1 and M3, these terminals receiving voltages representing the logical values of 1 and 0. An output from this flip-flop 100 representing the logical function $\bar{Q}$ is applied to an input of each of the "NAND" circuits 68 whilst the other output representing the logical function Q is applied to the "NAND" circuit 78. The microswitch M1 has two positions, one where it connects the voltage representing the logical value 1 to the set input of flip-flop 100 also the inverter 110 and the second where it connects the voltage representing logical value 0 to these devices. The output from the inverter 110 is applied to the set input of flip-flop 72 and also to a "NAND" circuit 106 which energizes a relay driver 107 to operate a motor 108 which drives the capstan 40. The "NAND" circuit 106 also receives an input from the output of the flip-flop 71 representing the logical function $\bar{Q}$.

The operation of the above described touch detecting teaching machine will now be described in greater detail. The sequence of operations described may be followed by reference to FIG. 6. FIG. 6 shows 12 waveforms or logical positions of various parts of the logic circuit. Waveforms n, p and q show the operative (upper level) and inoperative (lower level) of the respective microswitches M1, M2 and M3. Waveform r shows the time during which the touch detection system is enabled and waveforms s and t show the detection of a correct and incorrect response respectively. Waveform u shows whether the motor drive is on (upper level) or off (lower level). Waveforms v, w, x and y show the two states, set (upper level) and reset (lower level) of the flip-flops 100, 71, 72 and 84 respectively. Waveform z shows whether any relay 64 is energized (upper level) or de-energized (lower level). The times t1 to t6 along the base axis respectively represent:

t1: first card inserted          t4: second card inserted
t2: correct response             t5: incorrect response
t3: card ejected                 t6: card ejected The subject will be presented with a pack of cards 32 for insertion into the slot 16 of the casing of the machine. These cards are placed on the right hand side and the subject commences the operation of the machine by inserting the top card into the slot 16. Initially all the flip-flops are in the reset state. When a card is inserted into a slot the following events happen.

a. The leading edge of the card 32 operates the microswitch M1. This causes the flip-flop 100 to move to its set state and open the "NAND" circuit 78 so that voltage pulses from the oscillator 56 are applied to the ring counter 58. This sets the counter in operation for the generation of the random selection. The operation of the microswitch M1 also switches on the motor 108 through the inverter 110, "NAND" circuit 106 and the relay driver 107 to drive capstan 40.

b. Further insertion of the card 32 operates the microswitch M2. This causes the flip-flop 100 to move back to its reset state thus stopping the ring counter 58, which results in a random selection of the correct alternative. It will be appreciated that this selection is essentially random because the time taken to move the card by hand is so much greater than the period of the oscillator 56. The ring counter 58 is thus stopped so that one of the "NAND" circuits in each of the two sets 68 and 80 receives a signal representing the logical value 1. For example, if the machine has selected the duck to be the correct alternative, the "NAND" circuits 68c and 80c receive the logical value 1 on one of their inputs.

c. The card reaches the capstan 40 and magnetic heads 42. It is driven past the magnetic heads at a rate of about 2 inches per second. Since the other inputs of the "NAND" circuit 96 and the other from the flip-flop 100, which has reverted to its reset state, the "NAND" circuit 68c actuates the relay driver 62c through the inverter 109c so as to close the contact 64c. The magnetic head 42c is then connected to the amplifier 66 and replays the recorded passage on the magnetic strip 36c, e.g., "Point to the duck."

d. When the end of the card 32 reaches the microswitch M1, the latter moves back to its original position to stop the motor 108. Also, the flip-flop 72 is changed to the set state which provides the logical value 1 on one input of each of the "NAND" circuits 70. Since the "NAND" circuits already receive the logical value 1 on a second input from the flip-flop 71, they are so to speak unblocked and ready to register the response of the subject.

e. The card having stopped so that the three areas 34 are en-framed in the panels 18, the subject makes his choice having carefully listened to the recorded instructions. If the subject now touches the panel 18c, the "NAND" circuit 70c will be operated and give an output to the "NAND" circuits 74 and 80c. If, on the other hand the subject makes an incorrect response, the "NAND" circuit 70a or 70b is operated.

f. As soon as the subject has made his response (whether correct or not) the "NAND" circuit 74 is blocked which causes the flip-flop 71 to change to a set state and thus re-activate the relay driver 107 through the "NAND" circuit 106. The motor 108 thus restarts and drives the capstan 40 to move the card 32 out of the machine on the other side.

g. If the response is correct the flip-flop 84 is changed to the set state through "NAND" circuit 82 and inverter 86. "NAND" circuits 87 and 88 each have three inputs. One input is at a voltage representing the logical value 1 from the already set flip-flop 71. The second input is delayed by 10 milliseconds from the setting of flip-flop 71 by the delay circuit 90. This delay allows the flip-flop 84 to be fully determined before a voltage representing logical value 1 is set into one of the inputs of the performance computer 60 from either inverter 92 in the event of a correct response or inverter 94 in the event of an incorrect response.

h. If the response was correct the "NAND" circuit 96 is operated from the output of the "NAND" circuit 87. This causes the "NAND" circuit 68c to operate to energize the relay driver 62c which in turn closes the contact 64c. On the way out the magnetic head 42c replays the remainder of the track 36c which says "That's right."

i. When the card 32 clears the microswitch M3 the flip-flop 72 is changed to its reset state causing the flip-flops 71 and 84 to be reset. The re-setting of the flip-flop 71 causes the motor 108 to be switched off. The card is then extracted from the left hand side of the machine.

The machine is then ready to accept another card.

In modified form instead of printing the pictorial representations on the cards, the cards may carry transparencies which can be illuminated from behind.

In another modified form instead of switching between magnetic heads, a single head may be moved by solenoids actuated by drivers 62 to select the appropriate magnetic track.

The magnetic heads used for replaying the magnetic tracks may be used together with an associated erase section to record the auditory material on the cards using any well known magnetic recording technique. Thus, the tracks of new cards may have recordings placed thereon by means of the microphone jack 22 and key operated switch 26.

What I claim and desire to secure by Letters Patent is:

1. A touch detecting teaching machine including a plurality of display panels arranged to be touched by a subject; means for displaying symbolic visual information in each of said panels; means for randomly selecting one of the visual means displayed or presented in the panels to be the correct alternative; means for giving an audible indication to the subject requesting him to select the correct alternative in accordance with the audio indication given to him; electronic registering means for determining which of the plurality of items of symbolic visual information the subject has selected by touching one of the panels; and means for giving a further audible indication only if the correct related item is touched.

2. A touch detecting teaching machine according to claim 1, wherein the means for displaying the symbolic visual information comprises a card on which said information is printed so as to appear framed within the display panels when the card is inserted in the machine.

3. A touch detecting teaching machine according to claim 1, wherein the means for displaying the symbolic visual information comprises a card having a plurality of apertures in which transparencies are located, means being provided to illuminate the transparencies from behind.

4. A touch detecting teaching machine according to claim 1, including a card on which the symbolic visual information is displayed; an oscillator; a ring counter which receives pulses from the oscillator; first and second microswitches located in the path of travel of the card on insertion into the machine, said microswitches respectively controlling the starting and stopping of the ring counter, said counter having as many outputs as there are display panels associated with the electronic registering means, whereby the correct alternative is randomly preselected and the electronic registering means is notified of this pre-selection.

5. A touch detecting teaching machine according to claim 4, including as many magnetic tracks on each card as there are display panels, each track being divided into two parts, the first carrying a recording in spoken words relating to the item to be displayed or presented on the panel, the other part carrying a recording in spoken words implying that the subject's response is correct; as many separate magnetic heads in the machine as there are display panels, each head being located to read off from its respective magnetic track; as many relays as there are magnetic heads, each relay having a contact; a common audio amplifier and loud speaker connected to one of the magnetic heads through the contact of that relay which is energized by the output of the ring counter and electronic registering means, whereby the randomly selected correct alternative is audibly indicated to the subject, and in the event of him giving a correct response, a further message is audibly indicated affirming that his response was correct.

6. A touch detecting teaching machine according to claim 4, wherein the electronic registering means includes a first plurality of logic circuits each associated with a touch sensitive mechanism on a respective panel for registering a response, a second plurality of logic circuit for determining whether or not the subject has correctly responded, and in the event of a correct response activating the respective relay in order to audibly indicate to the subject that his response is correct.

7. A touch detecting teaching machine according to claim 4, wherein the card is driven by means of capstan through an electric motor, the magnetic heads being located in close proximity thereto, electronic means associated with said motor for stopping the motor when the card is in a central position whereby the symbolic visual information is displayed or presented in the panels, and for starting the motor to eject the card from the machine when the subject has made his response whether correct or not.

8. A touch detecting teaching machine according to claim 6, wherein there is provided a performance computer and a visual indicator, said computer being associated with the logic circuit of the electronic registering means and receiving the appropriate logical indication as to whether a response is correct or not and feeding the indicator with the subject's performance taking into account the previous responses.

9. A touch detecting teaching machine according to claim 5, wherein the magnetic heads are associated with a tape erasing and recording mechanism whereby new material may be recorded on the tracks of the card.

* * * * *